United States Patent
Primus et al.

(10) Patent No.: US 12,385,452 B2
(45) Date of Patent: Aug. 12, 2025

(54) FUEL INJECTOR FOR GASEOUS FUEL AND VALVE ASSEMBLY FOR THE SAME

(71) Applicant: Cummins Inc., Columbus, IN (US)

(72) Inventors: Raymond V. Primus, Bargersville, IN (US); Ross A. Phillips, Columbus, IN (US); Anthony Allan Shaull, Columbus, IN (US); Andrew Jacob Laska, Columbus, IN (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 18/604,846

(22) Filed: Mar. 14, 2024

(65) Prior Publication Data

US 2024/0344490 A1 Oct. 17, 2024

Related U.S. Application Data

(60) Provisional application No. 63/496,536, filed on Apr. 17, 2023.

(51) Int. Cl.
*F02M 21/02* (2006.01)

(52) U.S. Cl.
CPC .... *F02M 21/0275* (2013.01); *F02M 21/0254* (2013.01); *F02M 21/0257* (2013.01)

(58) Field of Classification Search
CPC .......... F02M 21/0275; F02M 21/0254; F02M 21/0257; F02M 21/0263; F02M 21/0266; F02M 21/0269; F02M 21/0248; F02M 21/026; Y02T 10/30
See application file for complete search history.

(56) References Cited

U.S. PATENT DOCUMENTS

| | | | |
|---|---|---|---|
| 6,065,692 | A | 5/2000 | Brinn, Jr. |
| 6,182,943 | B1 | 2/2001 | Steinruck et al. |
| 8,316,825 | B1 | 11/2012 | French, III |
| 9,453,486 | B1 | 9/2016 | Hornby et al. |
| 9,464,729 | B2 | 10/2016 | Robertson, III |
| 9,909,537 | B2 | 3/2018 | Hamada et al. |
| 10,364,758 | B2 | 7/2019 | Czimmek et al. |
| 2006/0060675 | A1 | 3/2006 | Cooke et al. |

(Continued)

FOREIGN PATENT DOCUMENTS

| | | | | |
|---|---|---|---|---|
| CA | 2771996 C | 3/2011 | | |
| CN | 103154490 A | * | 6/2013 | ......... F02M 21/0254 |

(Continued)

OTHER PUBLICATIONS

International Search Report and Written Opinion date mailed Aug. 23, 2024; PCT International Patent Application No. PCT/US24/19360, 11 pgs.

*Primary Examiner* — Lindsay M Low
*Assistant Examiner* — Charles J Brauch
(74) *Attorney, Agent, or Firm* — Taft Stettinius & Hollister LLP

(57) ABSTRACT

A fuel injector for gaseous fuel is provided. The fuel injector includes a valve assembly with a fuel flow valve and a second valve. The fuel flow valve is actively controlled to permit and prohibit gaseous fuel flow through the fuel injector. The second valve is spaced from the fuel flow valve and passively controlled to open in response to the gaseous fuel flow though the fuel flow valve, and to close when the gaseous fuel flow is terminated by closing the fuel flow valve.

20 Claims, 6 Drawing Sheets

(56) References Cited

U.S. PATENT DOCUMENTS

| | | |
|---|---|---|
| 2009/0008480 A1 | 1/2009 | Cooke |
| 2015/0267659 A1* | 9/2015 | Jaegle .................. F02M 51/061 239/585.5 |
| 2020/0116113 A1 | 4/2020 | Pirkl et al. |
| 2024/0344489 A1 | 10/2024 | Primus et al. |

FOREIGN PATENT DOCUMENTS

| | | |
|---|---|---|
| CN | 105986937 B | 10/2016 |
| CN | 106089500 A | 11/2016 |
| DE | 102013222030 A1 | 4/2015 |
| DE | 102021110884 A1 | 11/2022 |
| EP | 3153701 B1 | 12/2018 |
| WO | 98/26168 | 6/1998 |
| WO | 2022171574 A1 | 8/2022 |
| WO | 2024/220171 A1 | 10/2024 |

* cited by examiner

FUEL INJECTOR FOR GASEOUS FUEL AND VALVE ASSEMBLY FOR THE SAME

CROSS-REFERENCE TO RELATED APPLICATION

The present application claims the benefit of the filing date of U.S. Provisional Application Ser. No. 63/496,536 filed Apr. 17, 2023, which is incorporated herein by reference.

FIELD OF THE DISCLOSURE

The present disclosure relates generally to a fuel injector for providing gaseous fuel for an internal combustion engine and, more particularly, to a valve assembly arrangement for a fuel injector for gaseous fuel.

BACKGROUND

Fuel injectors for gaseous fuel injection are subject to extreme conditions due to pressure temperature changes. When combustion of the gaseous fuel occurs in the combustion chamber, high temperature combustion gases can flow back into the fuel injector, causing a rapid change in temperature and applied force to the injector components. The potential for wide variations in temperature and pressure conditions within the fuel injector can reduce fuel injector life and robustness. Therefore, there remains a need for the unique apparatuses, systems, and techniques disclosed herein.

DISCLOSURE OF ILLUSTRATIVE EMBODIMENTS

For the purposes of clearly, concisely and exactly describing illustrative embodiments of the present disclosure, the manner, and process of making and using the same, and to enable the practice, making and use of the same, reference will now be made to certain exemplary embodiments, including those illustrated in the figures, and specific language will be used to describe the same. It shall nevertheless be understood that no limitation of the scope of the invention is thereby created and that the invention includes and protects such alterations, modifications, and further applications of the exemplary embodiments as would occur to one skilled in the art.

SUMMARY

The present disclosure includes a valve assembly for a fuel injector of a gaseous fuel injection system for an internal combustion engine. The valve assembly includes a first valve to control the flow of gaseous fuel into the fuel injector, and a second valve spaced longitudinally from the first valve to control the flow of combustion gases from the combustion chamber back into the fuel injector. The ability to control the flow of gaseous fuel from the injector and the flow of combustion gases back into the fuel injector reduces exposure of fuel injector components to temperature changes, improves fuel injector robustness, and increases operating life.

In an embodiment, a fuel injector for providing gaseous fuel to a combustion chamber is provided. The fuel injector includes an elongated injector body defining a longitudinally extending fuel passage therein. The fuel passage extends from a gas inlet end to a gas outlet end of the injector body. The fuel injector includes a fuel flow valve that is selectively opened and closed to control gaseous fuel flow through the fuel passage to the combustion chamber. The fuel flow valve includes a valve seat that includes a seat passage, and the seat passage is in fluid communication with the fuel passage. The fuel flow valve also includes a plunger that includes a sealing member. The sealing member sealingly engages the valve seat to prevent gaseous fuel from flowing through the seat passage to the gas outlet end of the fuel injector body. The fuel injector also includes an actuator coupled to the plunger. The actuator is operable longitudinally displace the plunger from the valve seat to open the seat passage and permit gaseous fuel flow though the valve seat to the gas outlet end.

In an embodiment, a valve assembly is provided in an axially extending gaseous fuel passage of a fuel injector for providing gaseous fuel to a combustion chamber through a gas outlet end of the fuel injector. The valve assembly includes a first valve in the gaseous fuel passage and a second valve in the gaseous fuel passage. The first valve includes a first valve seat and a first plunger. The first plunger is actuatable between an open position in which the first plunger is axially spaced from the first valve seat to allow gaseous fuel flow through the first valve and a closed position in which the first plunger is in sealing contact with the first valve seat to prevent gaseous fuel flow through the first valve. The second valve is axially spaced from the first valve along the gaseous fuel passage. The second valve includes a second valve seat and a second plunger that engages with the second valve seat to inhibit combustion gases from reaching the first valve. The first plunger is moved toward the gas outlet end to open the first valve and the second plunger is moved toward the gas outlet end to open the second valve.

This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like numerals refer to like parts throughout the several views, and wherein.

DETAILED DESCRIPTION OF ILLUSTRATIVE EMBODIMENTS

Figure 1:
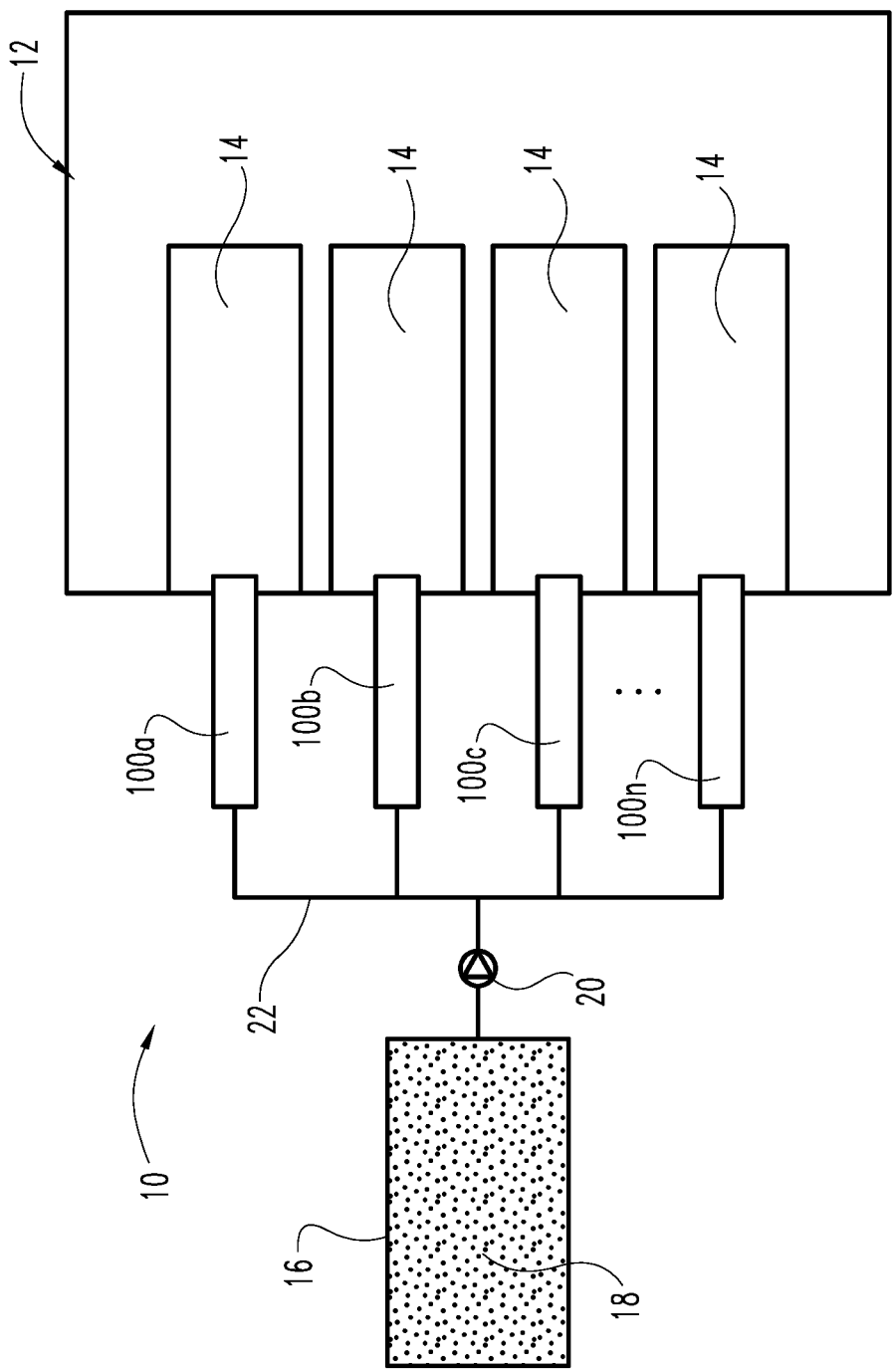
FIG. 1 is a schematic view of a fuel injection system.
Figure 2:
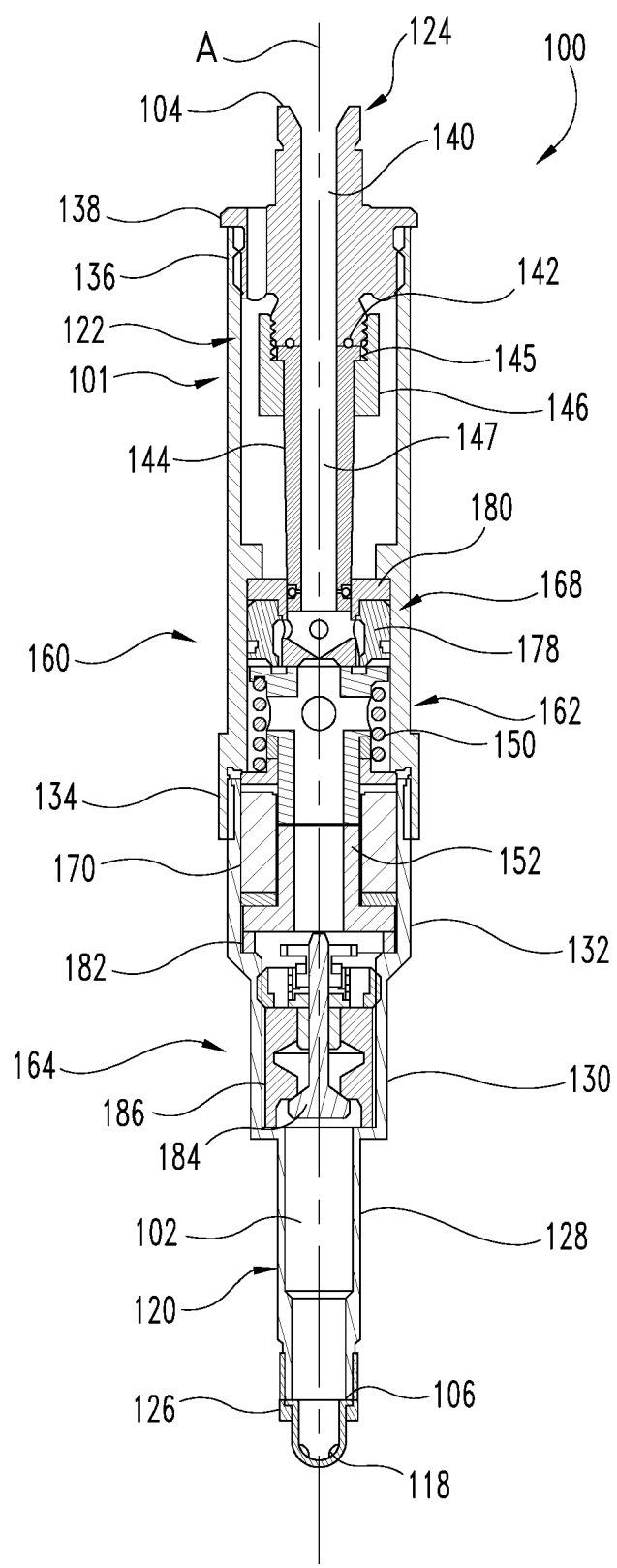
FIG. 2 is a longitudinal section view illustrating an example fuel injector for an internal combustion engine, according to an embodiment of the present disclosure.

With reference to FIG. 1, there is illustrated a fuel injection system 10 including at least one fuel injector 100*a*, 100*b*, 100*c* . . . 100*n* for a respective combustion chamber 14 of an internal combustion engine 12. The at least one fuel injector 100a, 100b, 100c ... 100n is in fluid communication with a fuel source 16 containing a gaseous fuel 18, and a fuel tank/regulator 20 and/or common rail 22 to distribute fuel to the injectors 100a, 100b, 100c ... 100n. Although multiple fuel injectors are shown schematically in FIG. 1, system 10 may include any number of fuel injectors, including one fuel injector. Pressurized gaseous fuel 18 is supplied to each of the fuel injectors 100a, 100b, 100c ... 100n from the fuel tank/regulator 20. In the discussion that follows, fuel injectors 100a, 100b, 100c ... 100n are described with reference to a fuel injector 100, such as shown in FIGS. 2-6.

In an embodiment, the fuel injector 100 provides gaseous fuel to combustion chamber 14. The fuel injector 100 includes an elongated injector body 101 defining a longitudinally extending fuel passage 102 therein. The fuel passage 102 extends from a gas inlet end 104 to a gas outlet end 106 of the injector body 101. The fuel injector 100 includes a fuel flow valve 162 that is selectively opened and closed to control gaseous fuel flow through the fuel passage 102 to the combustion chamber 14. The fuel flow valve 162 includes a valve seat 168 that includes a seat passage 221, and the seat passage 221 is in fluid communication with the fuel passage 102. The fuel flow valve 162 also includes a plunger 166 that includes a sealing member 214. The sealing member 214 sealingly engages the valve seat 168 to prevent gaseous fuel from flowing through the seat passage 221 to the gas outlet end 106 of the fuel injector body 101. The fuel injector 100 also includes an actuator 170 coupled to the plunger 166. The actuator 170 is operable longitudinally displace the plunger 166 from the valve seat 168 to open the seat passage 221 and permit gaseous fuel flow though the valve seat 168 to the gas outlet end 106.

In an embodiment, valve assembly 160 is provided in an axially extending gaseous fuel passage 102 of fuel injector 100 for providing gaseous fuel to combustion chamber 14 through gas outlet end 106 of the fuel injector 100. The valve assembly 160 includes a first valve 162 in the gaseous fuel passage 102 and a second valve 164 in the gaseous fuel passage 102. The first valve 162 includes a first valve seat 168 and a first plunger 166. The first plunger 166 is actuatable between an open position in which the first plunger 166 is axially spaced from the first valve seat 168 to allow gaseous fuel flow through the first valve 162 and a closed position in which the first plunger 166 is in sealing contact with the first valve seat 168 to prevent gaseous fuel flow through the first valve 162. The second valve 164 is axially spaced from the first valve 162 along the gaseous fuel passage 102. The second valve 164 includes a second valve seat 186 and a second plunger 184 that engages with the second valve seat 186 to inhibit combustion gases from reaching the first valve 163. The first plunger 166 is moved toward the gas outlet end 106 to open the first valve 162, and the second plunger 184 is moved toward the gas outlet end 106 to open the second valve 164.

Referring to FIGS. 2-6, injector body 101 extends along a central longitudinal axis A and includes fuel passage 102 that is defined by the injector body 101 from gas inlet end 104 to gas outlet end 106. The longitudinally extending fuel passage 102 receives valve assembly 160 and a valve actuator 170 therein to control gaseous fuel flow from gas inlet end 104 to gas outlet end 106, and to control combustion gas flow from gas outlet end 106 into fuel passage 102. In the discussion that follows, "proximal" or "proximally" refer to an axial location or upstream direction toward gas inlet end 104, and "distal" or "distally" refers to an axial location or downstream direction toward gas outlet end 106.

Injector body 101 can be comprised of multiple parts that are coupled to one another to form injector body 101. In the illustrated embodiment, injector body 101 includes an outlet part 120 extending from gas outlet end 106, an inlet part 124 extending from gas inlet end 104, and a transition part 122 that connects outlet part 120 and inlet part 124. Other embodiments contemplate an injector body 101 made from a single body part, from two body parts, or from more than two body parts.

Inlet part 124 includes a flange 138 to facilitate mounting of the fuel injector 100 on the engine 12. A feature may also be provided on the injector body 101 to facilitate injector mounting. Inlet part 124 also includes a gas passage 140 for receiving gaseous fuel flow into passage 102 of injector body 101. Inlet part 124 may also include a bore 141 for receiving wires (not shown) that are coupled to valve actuator 170.

A nozzle 118 is engaged to the end of outlet part 120 with a nozzle coupler 126. In other embodiments, a nozzle coupler 126 is not provided. Nozzle 118 may include one or more holes arranged to divert gaseous fuel flow in a desired direction or flow pattern into the combustion chamber 14. Nozzle 118 can be configured to optimize combustion of the gaseous fuel based on the combustion conditions of engine 12. Nozzle 118 is always open to allow the gaseous fuel flow to exit fuel passage 102, which also allows combustion gases to enter fuel passage 102.

In the illustrated embodiment, the outlet part 120 includes an interior 133 with three stepped regions 128, 130, 132. First stepped region 128 is adjacent to gas outlet end 106 and is coupled to nozzle 118. First stepped region 128 is smallest in diameter, and receives gaseous fuel flow from the opened second valve 164. In addition, combustion gases enter first stepped region 128 from the combustion chamber 14, as discussed further below.

Second valve 164 is housed primarily in second stepped region 130, and the fuel flow valve, also referred to as first valve 162, is partially housed in third stepped region 132. Transition part 122 is also engaged to third stepped region 132. In the illustrated embodiment, transition part 122 includes an insert region 134 that is configured to receive and be engaged to third stepped region 132, such as by a threaded, welded, press-fit, or other suitable engagement. The connection between outlet part 120 and transition part 122 can be sealed with injector body seal (not shown), such as an elastomeric ring. Transition part 122 also includes a receiving region 136 that receives and engages the inlet part 124, such as by a threaded, welded, press-fit, or other suitable engagement. Flange 138 of inlet part 124 can abut the outer proximal end of transition part 122 at receiving region 136.

Fuel injector 100 includes a tube 144 that is located in interior 137 of transition part 122. Tube 144 is engaged end-to-end with inlet part 124 with a tube coupler 146. Any type of coupling device for tube coupler 146 is contemplated. In the illustrated embodiment, tube coupler 146 includes internal threads to threadingly engage corresponding threads on inlet part 124, and an internal collar to support a flanged proximal end 145 of tube 144. As a result, tube 144 is axially fixed in body 101. An end seal 142 can be provided in a groove in the end face of inlet part 124 that seals against the abutting end of tube 144. Tube 144 includes a bore 147 that defines a part of fuel passage 102 from inlet part 124 to valve assembly 160.

Actuator 170 is located in interior 133 of third stepped region 132 of outlet part 120. In an embodiment, actuator 170 is an electronic actuator, such as a solenoid, that is electronically controlled by energizing and de-energizing a magnetic coil to actively and selectively control opening and closing for first valve 162 of valve assembly 160. An actuator retainer 150 is secured within insertion region 134 of transition part 122. Actuator mount 152 is positioned between actuator 170 and a spacer 182. Spacer 182 is located on lip 131 at the junction between stepped regions 130, 132 of outlet part 120. Plunger 166 extends into actuator 170 in an end-to-end arrangement with actuator mount 152.

First plunger 166 extends proximally from a distal or second end 234 within actuator 170 out of actuator 170 to a proximal or first end 232 in interior 137 of transition part 122. First plunger 166 is engaged to, and axially movable toward gas outlet end 106, by actuation of actuator 170. In an embodiment, first plunger 166 is an armature plunger. In an embodiment, first plunger 166 is comprised entirely of the same material. First end 232 of plunger 166 is biased into sealing engagement with first valve seat 168 by a first valve spring 172.

Figure 3:
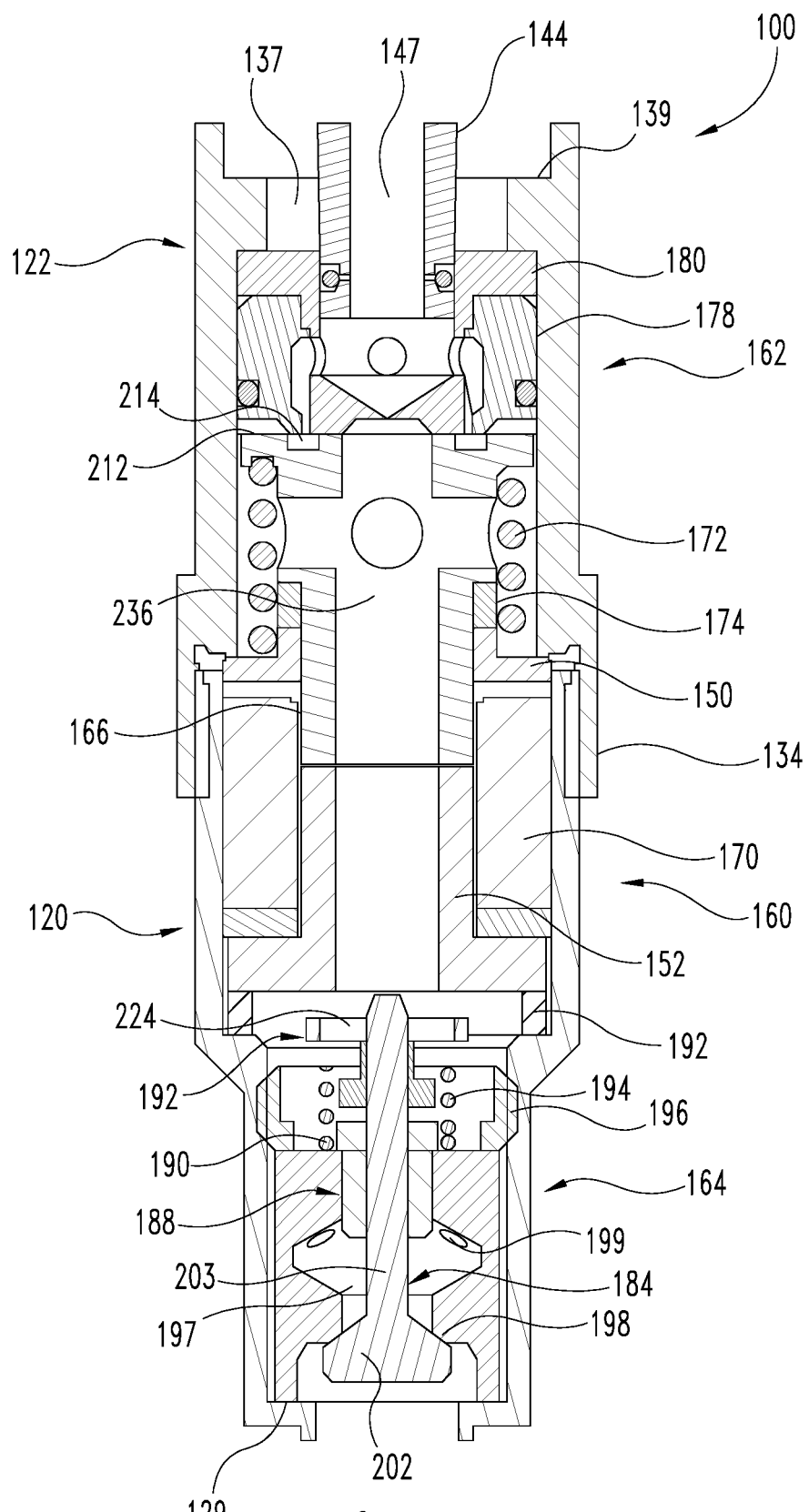
FIG. 3 is an enlarged longitudinal section view of the valve assembly of the fuel injector of FIG. 2 in a closed position.
Figure 4:
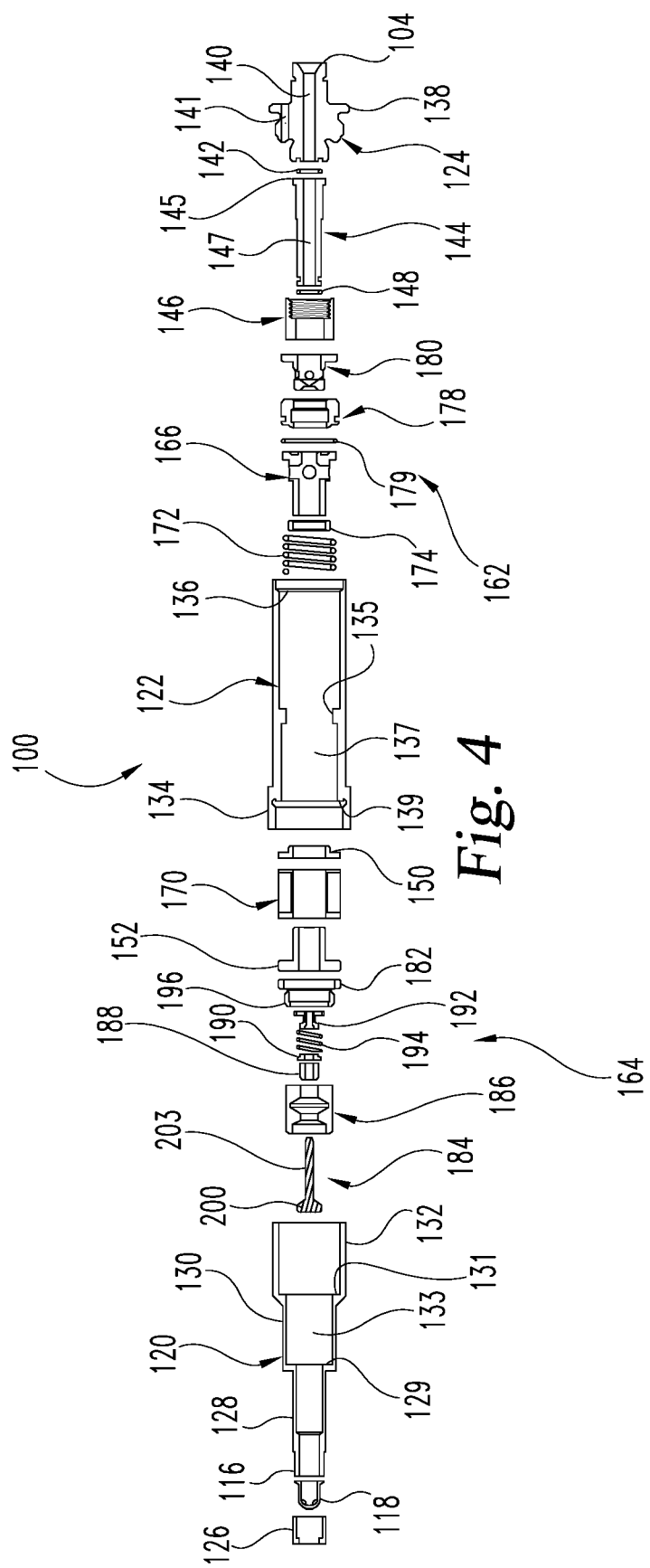
FIG. 4 is an exploded view of the fuel injector of FIG. 2.
Figure 5:
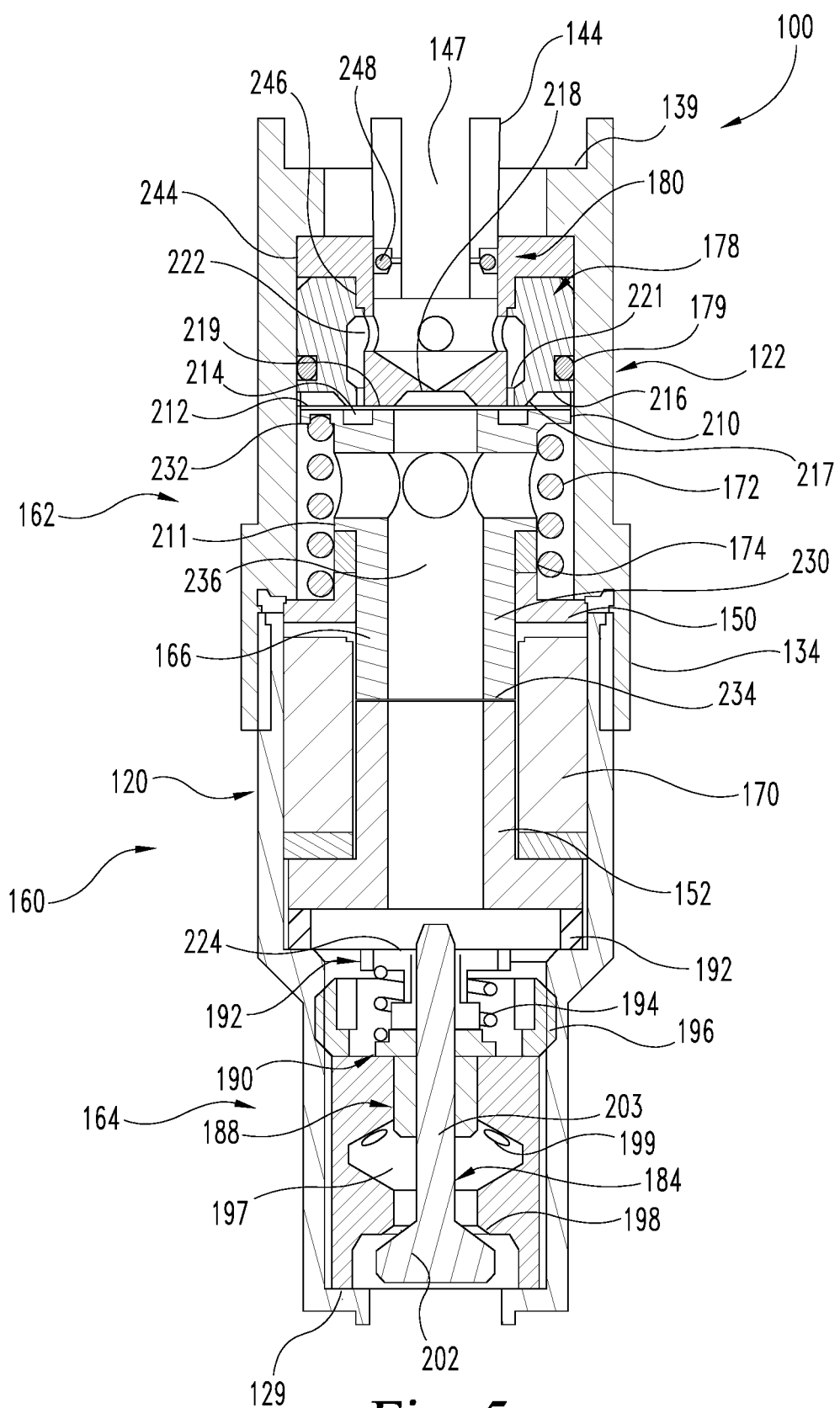
FIG. 5 is an enlarged longitudinal section view of the first valve of the valve assembly of FIG. 3 in an open position.

First valve spring 172 contacts a distally facing surface of plunger 166 formed by a plunger flange 210 at or near first end 232. First valve spring 172 also contacts a proximal side of actuator retainer 150 to bias first end 232 toward first valve seat 168. A buffer 174 is also provided between the actuator retainer 150 and a distally facing surface an intermediate lip 211 of plunger 166. Buffer 174 can be used to control the amount of axial movement of first plunger 166 in response to actuation by actuator 170. For example, when first valve 162 is closed, buffer 174 does not occupy the entire space between intermediate lip 211 of plunger 166 and actuator retainer 150, such as shown in FIG. 3. When first valve 162 is opened as shown in FIG. 5, first valve spring 172 compresses and the first plunger 166 translates axially in the distal direction until buffer 174 contacts each of intermediate lip 211 and the actuator retainer 150 to limit or prevent further axial displacement of first plunger 166 in the distal direction.

First valve seat 168 includes an outer seat member 178 and an inner seat member 180 located in interior 137 of transition part 122. Outer seat member 178 is sealingly engaged in with the inner wall of transition part 122 surrounding interior 137 with seat seal 179. Inner seat member 180 is located at least partially within outer seat member 178. Inner seat member 180 is supported and/or sealed to the distal end of tube 144, and in abutting engagement with a ledge 139 of transition part 122 that projects into interior 137. In the illustrated embodiment, first valve seat 168 is comprised of two separate members, but could also be made using a single member.

Second valve 164 includes second valve seat 186 supported on the proximally facing lip 129 between first stepped region 128 and second stepped region 130. A stopper 196 is engaged to outlet part 120 in stepped region 130 to secure second valve seat 186 against lip 129. Second valve seat 186 includes a cylindrical body having an inner bore 197 with a seat portion 198 projecting into inner bore 197. Second plunger 184 includes a head 202 that contacts seat portion 198 in the closed position of second valve 164, and head 202 is moved distally away from seat portion 198 to open second valve 164.

Second plunger 184 includes a stem 203 extending axially from head 202 through inner bore 197 toward first valve 162. Stem 203 includes a guide bushing 188 extending therearound. Other embodiments contemplate guide bushing 188 is omitted and plunger 184 is guided by second valve seat 186. A plunger stop 190 is positioned on top of valve seat 186 around stem 203. Guide bushing 188 is axially fixedly within second valve seat 186, and stem 203 can move axially relative to guide bushing 188 and plunger stop 190.

The proximal end of stem 203 of second plunger 184 is coupled to a collar 192, such as with a press fit or other fixed attachment, and collar 192 sets the stroke of second plunger 184. Collar 192 is biased proximally by a second valve spring 194 between collar 192 and plunger stop 190 so that head 202 of second plunger 184 is normally biased against seat 198. In an embodiment, head 202 and seat 198 are both made of metal material that is capable of withstanding temperatures produced by the combustion gases flowing from the combustion chamber into fuel passage 102. The metal-to-metal interface need not provide a seal that prevents all leakage of combustion gases through second valve 164, but is sufficient to limit exposure of first valve 162 to combustion temperatures.

Since second valve 164 is passively controlled by second valve spring 194 based on whether or not there is gaseous fuel flow through first valve 162, and since second valve 164 is not actuated by actuator 170 or connected to any components of first valve 162, the axial location of second valve 164 within body 101 can be optimized to balance temperature and gas mixing conditions for first valve 162 and second valve 164 during operation of the fuel injector 100 depending on combustion conditions expected for the fuel, combustion parameters, etc.

In response to gaseous flow being introduced from first valve 162, second valve spring 194 compresses due forces acting on collar 192 and head 202, which cause second plunger 184 to be displaced distally to an open position, as shown in FIG. 5. Stem 202 moves axially through guide bushing 188 until collar 192 contacts plunger stop 190, limiting the amount of distal displacement of second plunger 184. In the open position, head 202 is spaced distally from seat portion 198 to form a gap or passage for gaseous fuel flow to the combustion chamber 14.

Figure 6:
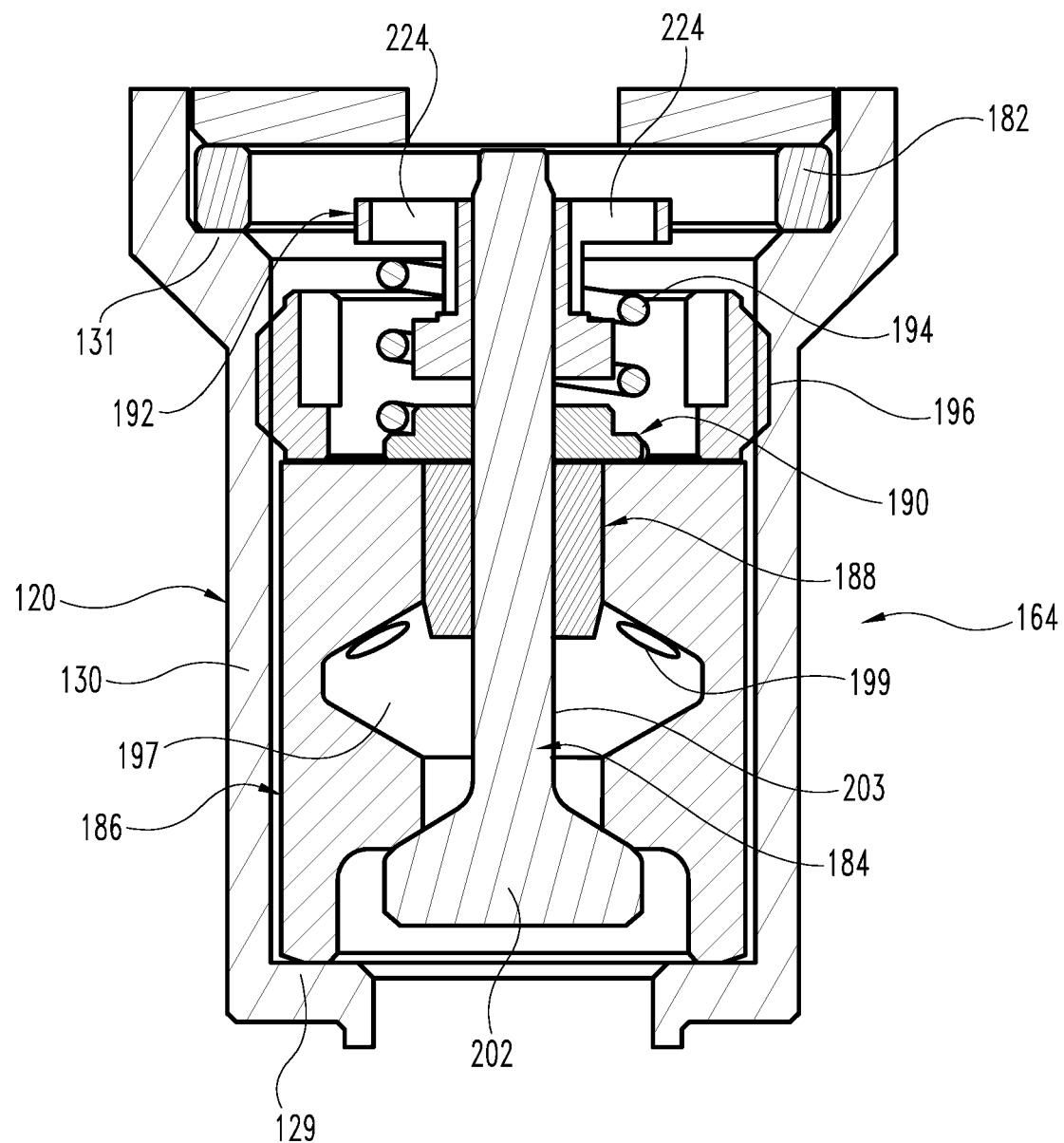
FIG. 6 is an enlarged longitudinal section view of the second valve of the valve assembly of FIG. 3 in a closed position.

During operation of fuel injector 100, gaseous fuel enters fuel passage 102 at gas inlet end 104. The gaseous fuel is prevented from flowing through fuel passage 102 by the first valve 162 of valve assembly 160 being in a closed position by first valve spring 172, as shown in FIG. 3. In addition, second valve 164 of valve assembly 160 is normally closed by second valve spring 194 so that combustion gases cannot flow into fuel passage 102 to reach first valve 162, as shown in FIGS. 3 and 6.

As discussed above, first valve spring 172 biases the first plunger 166 proximally into contact with the first valve seat 168. First plunger 166 includes an end face 212 that sealingly contacts the first valve seat 168 with the first valve 162 in the closed position. The end face 212 including an elastomeric sealing member 214 that is engaged at two locations by the axial protrusions 217, 219 of first valve seat 168 in the closed position of the first valve 162. Sealing member 214 can be, for example, a ring-shaped sealing member that is embedded or inset into a recess in end face 212 of plunger 166.

In the illustrated embodiment, outer seat member 178 includes an outer outlet end 216 with an axial protrusion 217 in sealing contact with the sealing member 214. In addition, inner seat member 180 includes an inner outlet end 218 with an axial protrusion 219 in sealing contact with the sealing member 214 at a second location that is separate from the first location. In an embodiment, the axial protrusion 217 on outer outlet end 216 and the axial protrusion 219 on inner outlet end 218 form concentric circles that contact sealing member 214 at two different radial locations around the annular sealing member 214. A seat passage 221 is formed through first seat 164 between axial protrusions 217, 219 since the inner outlet end 218 of inner seat member 180 is spaced radially inwardly from the outer outlet end 216 of outer seat member 178. In an embodiment, seat passage 221 is an annular passage formed between inner seat member 180 and outer seat member 178.

Gaseous fuel provided into fuel passage 102 through gas inlet end 104 flows out of inner seat member 180 through seat member sidewall outlets 222, and through the space between outer seat member 178 and inner seat member 180 into passage 221. In an embodiment, the gaseous fuel enters inner seat member 180 from bore 147 of tube 144, and then exits through a plurality of sidewall outlets 222 of inner seat member 180. When first valve 162 is closed, first valve spring 172 need only to counteract the force from the fuel pressure that acts on sealing member 214 by the gaseous fuel in passage 221. As a result, the coil or other mechanism of actuator 170 that displaces first plunger 166 can be reduced in size/force since the gaseous fuel force on first plunger 166 is only created by the gas pressure in passage 221 that acts on the surface area of sealing member 214 between axial protrusions 217, 219.

When first valve 162 is opened, gaseous fuel flow exits the passage 221 between the outer inlet end 216 and the inner outlet end 218 due to sealing member 214 of first plunger 166 breaking contact with the axial protrusions 217, 219 of outer seat member 178 and inner seat member 180, as shown in FIG. 5. The gaseous fuel then flows along end face 212 and inner outlet end 218 where it then enters axial passage 236 of plunger 166. Gaseous fuel from axial passage 236 then flows through an axial passage of actuator mount 152 and then flows through optional axial bores 224 defined by collar 192 and around collar 192 of second valve 164 into second valve 164.

The gaseous fuel pressure acting on head 202 of second plunger 184 compresses second valve spring 192 and distally displaces second plunger 184 to disengage it from seat portion 198, opening second valve 164 as shown in FIG. 5. The amount of distal displacement of second plunger 184 is limited by collar 192 contacting the plunger stop 190 in second valve seat 186. Gaseous fuel flows through one or more axial seat bores 199 formed through second valve seat 186 that open into inner bore 197.

When gaseous fuel flow is terminated, the actuator 170 is deactivated and first valve spring 172 returns first plunger 166 into sealing engagement with first valve seat 168. The termination of gaseous fuel flow also allows second valve spring 194 to return second plunger 184 into engagement with second valve seat 186. In the closed position, the second valve 164 prevents, or substantially prevents, combustion gases from reaching first valve 162. As a result, first valve 162 is subject to less severe temperature and pressure changes than would be created if second valve 164 were omitted.

In an embodiment the first plunger 166 includes an elongated cylindrical plunger body 230 axially extending from a first end 232 to an opposite second end 234. The second end 234 is engaged to actuator 170, and actuator 170 is operable to move the first plunger 166 axially toward and away from the first valve seat 168. The first end 234 includes end face 212 with sealing member 214 that sealingly contacts the first valve seat 168 while the first valve 162 is in the closed position.

In an embodiment, the elongated body 230 of the first plunger 166 includes an axial passage 236 that opens at the proximal first end 232 of the first plunger 166 for receiving gaseous fuel flow when first valve 162 is open. Plunger body 230 also includes plunger flange 210 at first end 232 and intermediate lip 211. Axial passage 236 extends through second end 234 of plunger body 230 and opens into the axial passage of actuator mount 152. Sealing member 214 extends around the opening of axial passage 236 in end face 212.

In an embodiment, first valve seat 168 includes an inner seat member 180 having a cylindrical body 246 extending from inner outlet end 218 to an opposite flanged second end 244. The inner outlet end 218 includes axial protrusion 219 that contacts the end face 212 of the first plunger 166 in the closed position of the first valve 162. The cylindrical body 246 extends around an inner bore 248 of the inner seat member 180, and the inner bore 248 is closed at the inner outlet end 218 of the first cylindrical body 240, and is axially open at the flanged second end 244 of the cylindrical body 240.

The cylindrical body 246 includes a plurality of sidewall outlets 222 distributed around the inner seat member 180. The plurality of sidewall outlets 222 allow gaseous fuel flow from the gas inlet end 104 to flow into passage 221, where it can be passed through first valve 162 when first valve 162 is opened. The second valve seat 186 of the second valve 164 includes an axial inner bore 197 to receive gaseous fuel flow from first valve 162 through axial seat bores 199. The gaseous fuel flow received from the axial passage 236 of plunger 166 displaces the second plunger 184 from the second valve seat 186 to open second valve 164. When first valve 162 is closed, the second valve spring 194 automatically closes second valve 164 to isolate combustion gases in fuel passage 102 distally of second valve 164.

Further written description of a number of example embodiments shall now be provided. According to one aspect of the present disclosure, a fuel injector is provided for gaseous fuel to a combustion chamber. The fuel injector includes an elongated injector body defining a longitudinally extending fuel passage therein. The fuel passage extends from a gas inlet end to a gas outlet end of the injector body. The fuel injector also includes a fuel flow valve that is selectively opened and closed to control gaseous fuel flow through the fuel passage to the combustion chamber. The fuel flow valve includes a valve seat that includes a seat passage, a plunger, and an actuator. The seat passage is in fluid communication with the fuel passage. The plunger includes a sealing member. The sealing member sealingly engages the valve seat to prevent gaseous fuel from flowing through the seat passage to the gas outlet end of the fuel injector body. The actuator is coupled to the plunger and is operable longitudinally displace the plunger from the valve seat to open the seat passage and permit gaseous fuel flow though the valve seat to the gas outlet end.

In an embodiment, the fuel injector includes a second valve configured to control combustion gas flow from the combustion chamber into the fuel passage through the gas outlet end. The second valve is downstream of the plunger of the fuel flow valve.

In an embodiment, the second valve includes a second plunger that is biased to a closed position, and the second plunger is moved from a closed position to an open position by the gaseous fuel flow through the fuel flow valve.

In an embodiment, the plunger of the fuel flow valve and the second plunger each move toward the gas outlet end to open the fuel flow valve and the second valve, respectively.

In an embodiment, the fuel flow valve includes a valve spring that biases the plunger into sealing engagement with the valve seat. In an embodiment, the plunger of the fuel flow valve and the actuator are both downstream of the valve seat.

In an embodiment, the plunger includes an end face that faces the valve seat, and the sealing member is located on the end face in order to sealingly engage the valve seat with the fuel flow valve in the closed position.

In an embodiment, the end face of the plunger faces the gas inlet end of the fuel injector body, and the sealing member is an elastomeric ring on the end face of the plunger.

In an embodiment, the valve seat of the fuel flow valve includes an outer seat member, an inner seat member, and a seat passage. The outer seat member includes an outer inlet end in contact with the sealing member. The inner seat member is located at least partially within the outer seat member, and the inner seat member includes an inner inlet end in contact with the sealing member. The seat passage is between the outer seat member and the inner seat member.

In an embodiment, the seat passage is an annular opening between the inner seat member and the outer seat member. The sealing member spans the seat passage between the inner seat member and the outer seat member.

In an embodiment, the outer seat member includes a first axial protrusion that contacts the sealing member in the closed position of the fuel flow valve. The inner seat member includes a second axial protrusion that contacts the sealing member in the closed position of the fuel flow valve.

In an embodiment, the seat passage extends between the first axial protrusion and the second axial protrusion.

In an embodiment, the fuel injector includes a nozzle on the gas outlet end of the injector body. The nozzle is configured to divert gaseous fuel flow through the gas outlet end into the combustion chamber.

According to another aspect of the present disclosure, a valve assembly in an axially extending gaseous fuel passage of a fuel injector for providing gaseous fuel to a combustion chamber through a gas outlet end of the fuel injector is provided. The valve assembly includes a first valve in the gaseous fuel passage and a second valve in the gaseous fuel passage. The first valve includes a first valve seat and a first plunger. The first plunger is actuatable between an open position in which the first plunger is axially spaced from the first valve seat to allow gaseous fuel flow through the first valve and a closed position in which the first plunger is in sealing contact with the first valve seat to prevent gaseous fuel flow through the first valve. The second valve is axially spaced from the first valve along the gaseous fuel passage. The second valve includes a second valve seat and a second plunger that engages with the second valve seat to inhibit combustion gases from reaching the first valve. The first plunger is moved toward the gas outlet end to open the first valve and the second plunger is moved toward the gas outlet end to open the second valve.

In an embodiment, the second plunger moves axially away from the first valve and disengages the second valve seat in response to gaseous fuel flow through the first valve.

In an embodiment, the first valve includes a first valve spring that biases the first plunger toward the first valve seat in a direction opposite the gas outlet end of the fuel injector.

In an embodiment, the second valve includes a second valve spring that biases the second plunger toward the second valve seat in a direction opposite the gas outlet end of the fuel injector.

In an embodiment, the valve assembly includes an electronic actuator operable to actuate the first plunger between the open position and the closed position. The electronic actuator is located between the first valve and the second valve and the second plunger is not actuatable by the electronic actuator.

In an embodiment, the second valve seat includes a plurality of axial seat bores to receive gaseous fuel flow from the first valve, and a seat portion downstream of the plurality of axial seat bores. The second plunger engages the seat portion in the closed position of the second valve.

In an embodiment, the first valve seat includes an outer seat member, an inner seat member, and a seat passage. The outer seat member includes an outer inlet end in sealing contact with the first plunger while the first valve is in the closed position. The inner seat member is located at least partially within the outer seat member. The inner seat member includes an inner inlet end in sealing contact with the second plunger while the first valve is in the closed position. The seat passage extends between the outer seat member and the inner seat member. The seat passage is configured to allow gaseous fuel flow through the first valve seat while the first valve is in the open position.

While illustrative embodiments of the disclosure have been illustrated and described in detail in the drawings and foregoing description, the same is to be considered as illustrative and not restrictive in character, it being understood that only certain exemplary embodiments have been shown and described and that all changes and modifications that come within the spirit of the claimed inventions are desired to be protected. It should be understood that while the use of words such as preferable, preferably, preferred or more preferred utilized in the description above indicates that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A fuel injector for providing gaseous fuel to a combustion chamber, the fuel injector comprising:
   an elongated injector body defining a longitudinally extending fuel passage therein, the fuel passage extending from a gas inlet end to a gas outlet end of the injector body;
   a fuel flow valve that is selectively opened and closed to control gaseous fuel flow through the fuel passage to the combustion chamber, wherein the fuel flow valve includes:
      a valve seat that includes a seat passage, the seat passage in fluid communication with the fuel passage, wherein the valve seat includes an outer seat member including an outer inlet end, an inner seat member including an inner inlet end and located at least partially within the outer seat member, and the seat passage is between the outer seat member and the inner seat member; and
      a plunger including a sealing member, wherein the sealing member sealingly engages the valve seat to prevent gaseous fuel from flowing through the seat passage to the gas outlet end of the fuel injector body; and
   an actuator coupled to the plunger, wherein the actuator is operable longitudinally displace the plunger from the valve seat to open the seat passage and permit gaseous fuel flow though the valve seat to the gas outlet end.

2. The fuel injector of claim 1, further comprising:
a second valve configured to control combustion gas flow from the combustion chamber into the fuel passage through the gas outlet end, wherein the second valve is downstream of the plunger of the fuel flow valve.

3. The fuel injector of claim 2, wherein:
the second valve includes a second plunger that is biased to a closed position; and
the second plunger is moved from a closed position to an open position by the gaseous fuel flow through the fuel flow valve.

4. The fuel injector of claim 3, wherein the plunger of the fuel flow valve and the second plunger each move toward the gas outlet end to open the fuel flow valve and the second valve, respectively.

5. The fuel injector of claim 1, wherein the fuel flow valve includes a valve spring that biases the plunger into sealing engagement with the valve seat.

6. The fuel injector of claim 1, wherein the plunger of the fuel flow valve and the actuator are both downstream of the valve seat.

7. The fuel injector of claim 1, wherein the plunger includes an end face that faces the valve seat, and the sealing member is located on the end face in order to sealingly engage the valve seat with the fuel flow valve in the closed position.

8. The fuel injector of claim 7, wherein the end face of the plunger faces the gas inlet end of the fuel injector body, and the sealing member is an elastomeric ring on the end face of the plunger.

9. The fuel injector of claim 1, wherein with the sealing member sealingly engaged to the valve seat:
the outer inlet end of the outer seat member is in contact with the sealing member; and
the inner inlet end of the inner seat member is in contact with the sealing member.

10. The fuel injector of claim 9, wherein:
the seat passage is an annular opening between the inner seat member and the outer seat member; and
the sealing member spans the seat passage between the inner seat member and the outer seat member.

11. The fuel injector of claim 10, wherein:
the outer seat member includes a first axial protrusion that contacts the sealing member in the closed position of the fuel flow valve; and
the inner seat member includes a second axial protrusion that contacts the sealing member in the closed position of the fuel flow valve.

12. The fuel injector of claim 11, wherein the seat passage extends between the first axial protrusion and the second axial protrusion.

13. The fuel injector of claim 1, further comprising a nozzle on the gas outlet end of the injector body, wherein the nozzle is configured to divert gaseous fuel flow through the gas outlet end into the combustion chamber.

14. A valve assembly in an axially extending gaseous fuel passage of a fuel injector for providing gaseous fuel to a combustion chamber through a gas outlet end of the fuel injector, the valve assembly comprising:
a first valve in the gaseous fuel passage, the first valve including a first valve seat and a first plunger, wherein the first plunger is actuatable between an open position in which the first plunger is axially spaced from the first valve seat to allow gaseous fuel flow through the first valve and a closed position in which the first plunger is in sealing contact with the first valve seat to prevent gaseous fuel flow through the first valve; and
a second valve in the gaseous fuel passage, the second valve axially spaced from the first valve along the gaseous fuel passage, the second valve including a second valve seat downstream of the first valve seat to receive gaseous fuel flow from the first valve seat when the first plunger is in an open position, the second valve including a second plunger that engages with the second valve seat to inhibit combustion gases from flowing upstream through the second valve to reach the first valve seat, wherein the first plunger is moved toward the gas outlet end to open the first valve and the second plunger is moved toward the gas outlet end to open the second valve.

15. The valve assembly of claim 14, wherein the second plunger moves axially away from the first valve and disengages the second valve seat in response to gaseous fuel flow through the first valve.

16. The valve assembly of claim 14, further comprising a first valve spring that biases the first plunger toward the first valve seat in a direction opposite the gas outlet end of the fuel injector.

17. The valve assembly of claim 16, further comprising a second valve spring that biases the second plunger toward the second valve seat in a direction opposite the gas outlet end of the fuel injector.

18. The valve assembly of claim 14, further comprising an electronic actuator operable to actuate the first plunger between the open position and the closed position, wherein the electronic actuator is located between the first valve and the second valve and the second plunger is not actuatable by the electronic actuator.

19. The valve assembly of claim 14, wherein the second valve seat includes:
a plurality of axial seat bores to receive gaseous fuel flow from the first valve; and
a seat portion downstream of the plurality of axial seat bores, the second plunger engaging the seat portion in the closed position of the second valve.

20. A valve assembly in an axially extending gaseous fuel passage of a fuel injector for providing gaseous fuel to a combustion chamber through a gas outlet end of the fuel injector, the valve assembly comprising:
a first valve in the gaseous fuel passage, the first valve including a first valve seat and a first plunger, wherein the first plunger is actuatable between an open position in which the first plunger is axially spaced from the first valve seat to allow gaseous fuel flow through the first valve and a closed position in which the first plunger is in sealing contact with the first valve seat to prevent gaseous fuel flow through the first valve, wherein the first valve seat includes:
an outer seat member, the outer seat member including an outer inlet end in sealing contact with the first plunger while the first valve is in the closed position;
an inner seat member located at least partially within the outer seat member, the inner seat member including an inner inlet end in sealing contact with the second plunger while the first valve is in the closed position; and
a seat passage extends between the outer seat member and the inner seat member, the seat passage configured to allow gaseous fuel flow through the first valve seat while the first valve is in the open position; and a second valve in the gaseous fuel passage, the second valve axially spaced from the first valve along the gaseous fuel passage, the second valve including a second valve seat and a second plunger that engages with the second valve seat to inhibit combustion gases from reaching the first valve, wherein the first plunger is moved toward the gas outlet end to open the first valve and the second plunger is moved toward the gas outlet end to open the second valve.

\* \* \* \* \*